(12) United States Patent
Keller et al.

(10) Patent No.: US 6,662,312 B1
(45) Date of Patent: Dec. 9, 2003

(54) SOFTWARE-TESTING AUTOMATION SYSTEM

(75) Inventors: Spencer A. Keller, Boulder, CO (US); Anne-Marie Scheidegger, Boulder, CO (US)

(73) Assignee: Qwest Communications International Inc., Denver, CO (US)

( * ) Notice: Subject to any disclaimer, the term of this patent is extended or adjusted under 35 U.S.C. 154(b) by 559 days.

(21) Appl. No.: 09/607,732

(22) Filed: Jun. 30, 2000

(51) Int. Cl.[7] ............................................. G06F 11/00
(52) U.S. Cl. ............................................. 714/38; 717/4
(58) Field of Search .......................... 714/38, 39, 27, 714/31, 46; 717/4, 8, 9, 125, 127

(56) References Cited

U.S. PATENT DOCUMENTS

| | | | | |
|---|---|---|---|---|
| 5,615,331 A | * | 3/1997 | Toorians et al. | 714/9 |
| 5,701,471 A | * | 12/1997 | Subramanyam | 707/200 |
| 6,002,869 A | * | 12/1999 | Hinckley | 717/124 |
| 6,167,537 A | * | 12/2000 | Silva et al. | 714/46 |
| 6,182,246 B1 | * | 1/2001 | Gregory et al. | 714/38 |
| 6,301,701 B1 | * | 10/2001 | Walker et al. | 717/125 |
| 6,311,327 B1 | * | 10/2001 | O'Brien et al. | 717/114 |
| 6,370,682 B1 | * | 4/2002 | Eckardt et al. | 717/141 |
| 6,484,276 B1 | * | 11/2002 | Singh et al. | 714/41 |

* cited by examiner

*Primary Examiner*—Nadeem Iqbal
(74) *Attorney, Agent, or Firm*—Brooks Kushman P.C.

(57) ABSTRACT

A software-testing automation system for tests a plurality of deployed images that are spread across multiple software platforms. Each deployed image includes a test component configured to accept a connection on a known testing port, and the test component for a deployed image is inserted in a development environment and is then integrated into the image upon deployment. The system includes a test engine configured to run a plurality of tests on the plurality of deployed images. The test engine runs a test on an image under test by requesting a connection to the corresponding test component on the known testing port and sending commands over the connection. A user interface connected to the test engine allows a user to control the test engine and to view test results. An alternative embodiment utilizes a well-known test engine interface and a plurality of adaption layers to connect to external test tools.

31 Claims, 3 Drawing Sheets

Name: AddResidentialMailboxTest

Description: This test creates an in action for a residential mailbox and verifies that the GUI has correctly saved the action in the database.

Result of last run: 4 test steps passed out of 5 run out of 12 scheduled to run

| Name of test step | Type of test step | Variables | | | |
|---|---|---|---|---|---|
| CleanDataBase | UNIX script | | | | |
| LoadDataBase | UNIX script | ResidentialCustomer.data | | | |
| StartMailboxGui | NT batch job | | | | |
| EnterText | GUI test tool command | MainMailboxWindow | Main Telephone#Field | 3035460254 | |
| VerifyText | GUI test tool command | MainMailboxWindow | Customer#Field | 32777101 | |
| PressKey | GUI test tool command | MainMailboxWindow | F7Key | | |
| EnterText | GUI test tool command | AddMailboxWindow | Mailbox#Field | 3035461554 | |
| EnterText | GUI test tool command | AddMailboxWindow | ActionField | In | |
| EnterText | GUI test tool command | AddMailboxWindow | MailboxTypeField | Residential | |
| PressButton | GUI test tool command | AddMailboxWindow | SaveButton | | |
| GrabMailboxDatainDataBase | SQL query | Mailbox.table | allField | | whereMailbox#=3035461554 |
| CompareToExpectedData | UNIX script | AddResMailbox.expected | AddResMailbox.actual | | |

SOFTWARE-TESTING AUTOMATION SYSTEM

TECHNICAL FIELD

The present invention relates to a software-testing automation system.

BACKGROUND ART

Developing and testing software is an involved process. Typically, a software developer utilizes a software development platform to build a piece of software. In the development environment, the software may be tested by the developer, and after the developer is satisfied with testing results, the piece of software may be deployed to create an image. The deployed image is different than the piece of software made up of developer code in that the deployed image does not require the development environment to run. That is, the deployed image may run on the designated software platform without the development environment.

There are many different kinds of software platforms. One of the most widely recognized software platforms is the operating system. Further, there are many commercial operating systems available. Typically, a deployed image for one particular operating system will not run properly on another operating system. Some development environments attempt to provide tools to make porting of software from one platform to another (that is, one operating system to another) easier. However, this is not the easiest task.

In addition to operating systems, another type of platform is the virtual machine. The virtual machine lies somewhere between the development environment and the operating system. A deployed image for a particular virtual machine may run in that virtual machine in a number of different operating systems. As such, a deployed image for a virtual machine may be operating system independent. All in all, developing software is an involved process that involves quite a bit of testing in the development environment prior to deploying the piece of software as a deployed image for operation either on a specific virtual machine or in a specific operating system. There are some existing tools that assist the software developer in testing software, but these tools are either restricted to use in the development environment, or are platform specific, that is, designed for use in a single virtual machine or operating system.

For the foregoing reasons, there is a need for a software-testing automation system that improves over the prior art.

DISCLOSURE OF INVENTION

It is, therefore, an object of the present invention to provide a software-testing automation system for testing a plurality of deployed images that are spread across multiple software platforms wherein each deployed image includes a test component configured to accept a connection on a known testing port, and in which a test engine runs a test on an image by requesting a connection on the known testing port.

It is another object of the present invention to provide a software testing automation system that communicates with test tools spread across multiple platforms, and preferably may run external scripts, programs, and data base queries.

In carrying out at least one object, a software-testing automation system for testing a plurality of deployed images that are spread across multiple software platforms is provided. Each deployed image includes a test component configured to accept a connection on a known testing port. The test component for a deployed image is inserted in a development environment and is then integrated into the image upon deployment. The system comprises a test engine and a user interface. The test engine is configured to run a plurality of tests on the plurality of deployed images. The test engine runs a test on an image under test by requesting a connection to the corresponding test component on the known testing port, and sending commands over the connection. The user interface is connected to the test engine to allow a user to control the test engine and to view test results.

Preferably, the test engine is further configured to create and manage tests under the direction of a user interacting with the test engine through the user interface. Further, preferably, the test engine is further configured to display test results through the user interface. Further, preferably, at least one of the known testing ports is a transmission control protocol/Internet protocol (TCP/IP) well-known port. More preferably, each known testing port is the same transmission control protocol/Internet protocol (TCP/IP) well-known port.

Further, in a preferred embodiment, each test component is configured to, upon receiving commands over the testing port, operate on an object level to enter text into a text input box in the corresponding image. Further, preferably, each test component is configured to, upon receiving commands over the testing port, operate on an object level to retrieve a text value from a text box in the corresponding image. Further, preferably, each test component is configured to, upon receiving commands over the testing port, operate on an object level to open a new window in the corresponding image. Further, preferably, each test component is configured to, upon receiving commands over the testing port, operate on an object level to press a button in a graphical user interface of the corresponding image.

Further, in carrying out the present invention, a software-testing automation system for testing a plurality of deployed images that are spread across multiple software platforms is provided. The software platforms include multiple different virtual machines and operating systems. The system comprises a plurality of test components, a test engine, and a user interface. Each deployed image includes a corresponding test component. Each test component is configured to accept a connection on a known testing port. The corresponding test component for a deployed image is inserted in a development environment and is then integrated into the image upon deployment such that the test component for a deployed image operates at an object level of a corresponding software platform. The test engine is configured to run a plurality of tests on the plurality of deployed images. The test engine runs a test on an image under test by requesting a connection to the corresponding test component on the known testing port, and sending commands over the connection. The user interface is connected to the test engine to allow a user to control the test and to view test results.

Preferably, the test engine is further configured to create and manage tests under the direction of a user interacting with the test engine through the user interface. Further, preferably, the test engine is further configured to display test results through the user interface.

Preferably, at least one of and preferably each known testing port is a transmission control protocol/Internet protocol (TCP/IP) well-known port. More preferably, all test components use the same well-known port.

In a preferred embodiment, each test component is configured to, upon receiving commands over the testing port, operate on an object level to enter text into a text input box in the corresponding image. Preferably, each test component is configured to, upon receiving commands over the testing port, operate on an object level to retrieve a text value from a text box in the corresponding image. Preferably, each test component is configured to, upon receiving commands over the testing port, operate on an object level to open a new window in the corresponding image. Preferably, each test component is configured to, upon receiving commands over the testing port, operate on an object level to press a button in a graphical user interface of the corresponding image.

Still further, in carrying out the present invention, a computer readable storage medium having instructions stored thereon executable by a computer to perform automated software testing for a plurality of deployed images that are spread across multiple software platforms is provided. Each deployed image includes a test component configured to accept a connection on a known testing port. The test component for a deployed image is inserted in a development environment and is then integrated into the image upon deployment. The medium comprises test engine instructions for running a plurality of tests on the plurality of deployed images. The test engine instructions run a test on an image under test by requesting a connection to the corresponding test component on the known testing port and sending commands over the connection.

Even further, in carrying out the present invention, a software-testing automation system for communicating with a plurality of test tools that are spread across multiple software platforms is provided. Each test tool has an applications programming interface. The system comprises a test engine, a plurality of adaption layers, and a user interface. The test engine is configured to communicate with the plurality of test tools. The test engine has a well-known interface. Each adaption layer connects the test engine well-known interface to the applications programming interface of a corresponding test tool. The user interface is connected to the test engine to allow a user to control the test engine and to view the test results.

In a preferred embodiment, at least one of the test tools is a graphical user interface test tool operative to receive commands through the corresponding adaption layer. Preferably, the graphical user interface test tool is configured, upon receiving commands, through the corresponding adaption layer, to operate on an object level to enter text into a text input box in the corresponding image, retrieve a text value from a text box in the corresponding image, open a new window in the corresponding image, and press a button in the corresponding image. Further, preferably, the test engine is further configured to display test results through the user interface. Even further, preferably, the test engine is configured to create and manage tests under the direction of a user interacting with the test engine through the user interface.

In a preferred implementation, the test engine is further configured to run an external script that is external to the test engine, in addition to communicating with one or more test tools and possibly one or more test components. Further, preferably, the test engine is configured to run a database query. Still further, the test engine is preferably configured to run an external program that is external to the test engine.

Yet further, in carrying out the present invention, a software-testing automation system for communicating with a plurality of test tools that are spaced across multiple software platforms is provided. Each test tool has an applications programming interface. The system comprises a test engine, a plurality of adaption layers, and a user interface. The test engine is configured to communicate with the plurality of test tools. The test engine has a well-known interface. The test engine is further configured to run an external script, to run an external program, and to query a data base. Each adaption layer connects the test engine well-known interface to the applications programming interface of a corresponding test tool. The user interface is connected to a test engine to allow a user to control the test engine and direct the communications through the adaption layers with the test tools, and direct the running of scripts and programs, as well as the running of data base queries.

The advantages associated with the present invention are numerous. For example, embodiments of the present invention provide a test engine that can drive any kind of test automation tool from one common user interface. The user interface presents the modular building-block test steps in such a way that the tester does not need to know about how the test steps are implemented by the test automation tools. Moreover, the engine allows the tester to mix test steps that will be executed by different tools in one test case, which can be executed at one button press. Specifically, some embodiments of the present invention provide a software-testing automation system for testing a plurality of deployed images that are spread across multiple software platforms with each deployed image include a test component.

The above object and other objects, features, and advantages of the present invention are readily appreciated from the following detailed description of the best mode for carrying out the invention when taken in connection with the accompanying drawings.

BRIEF DESCRIPTION OF DRAWINGS

FIG. 4 is an exemplary user interface for use with the test engine of the present invention.

BEST MODE FOR CARRYING OUT THE INVENTION

Figure 1:
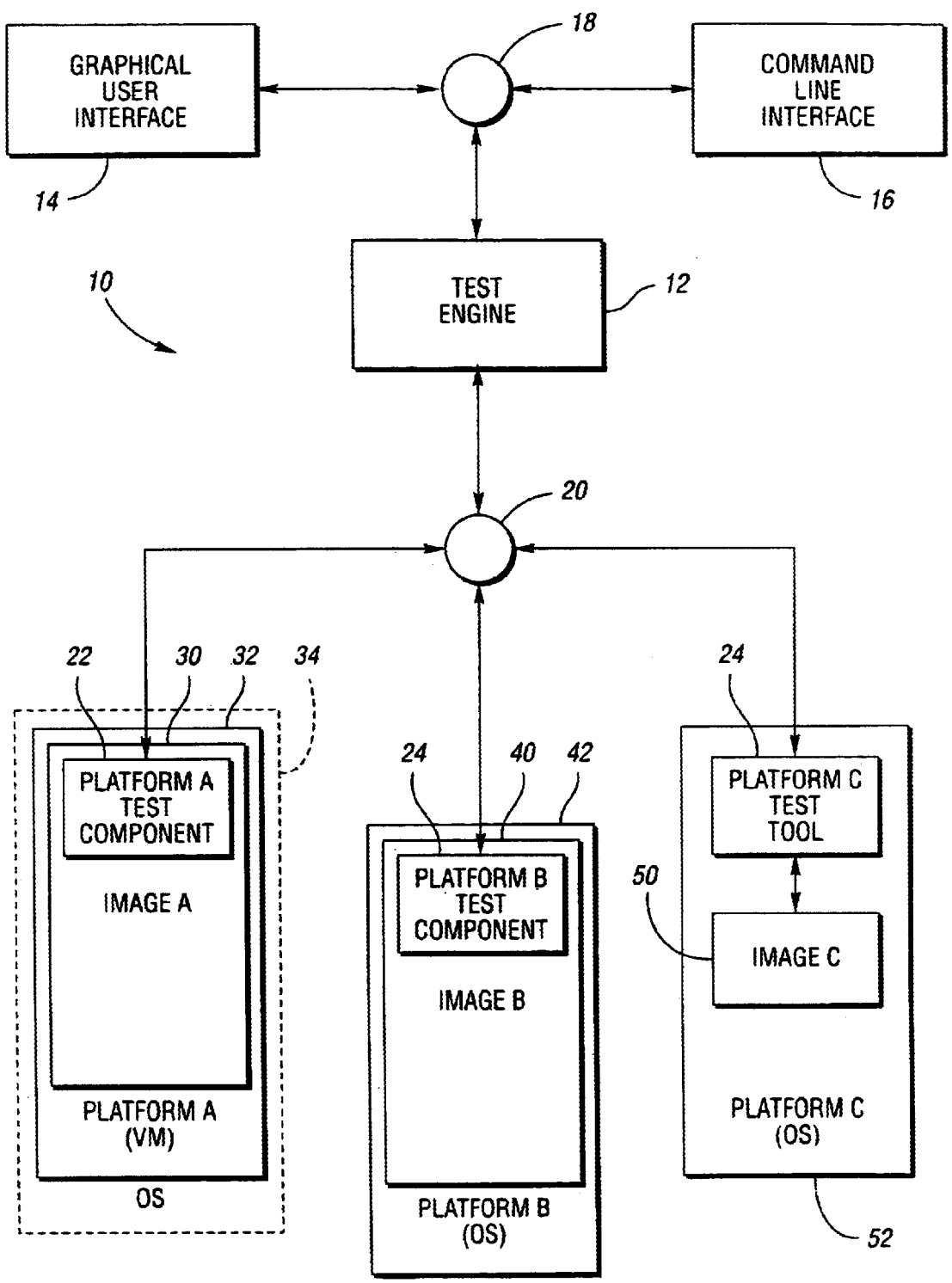
FIG. 1 is a block diagram illustrating a software-testing automation system of the present invention, showing the test engine, user interfaces, and the test components on the various platforms, including virtual machines and operating systems.

With reference to FIG. 1, the software-testing automation system of the present invention is generally indicated at 10. Because testing software in a large-scale software implementation over a network with much of the software on different platforms, includes different virtual machines and different operating systems, embodiments of the present invention involve testing software over all these different software environments. The different software environments may include graphical user interfaces written in different programming languages, UNIX code, database interactions, etc. A software-testing automation system of the present invention allows a user to build tests that exercise multiple software platforms all in one test. In accordance with the present invention, a test component from any software platform may be plugged in to the test engine because some of the embodiments of the present invention, for the first time, utilize deployed images spread across multiple platforms with each deployed image including a test component configured to accept a connection on a known testing port. The test engine runs a test on an image under test by requesting a connection to the corresponding test component on the known testing port and sending commands over the connection. Further, some embodiments employ a well-known interface at the test engine that allows adaption layers to connect the engine to various testing tools.

In accordance with the present invention, the software-testing automation system includes a test engine 12, a user interface including a graphical user interface 14 and/or a command line interface 16, and the various test components 22, 24, and test tool 26. As shown in FIG. 1, connector 18 connects the graphical user interface 14 and the command line interface 16 to test engine 12. Connector 20 connects test engine 12 to the various test components 22, 24, and test tool 26. Advantageously, the various test elements may be located on different software platforms while utilizing a known testing port to communicate with test engine 12. Specifically, these various software platforms that the test elements are spread across are virtual machines and/or operating systems, and are not required to be development environments.

In FIG. 1, test component 22 is a part of deployed image 30. That is, test component 22 is inserted into image 30 in the development environment, and then the deployed image includes the test component. The deployed image 30 runs in a virtual machine 32. Virtual machine 32 runs in an operating system 34, which may be any operating system that supports the particular virtual machine. Test tool 26 communicates through an adaption layer with a well-known interface on the test engine to run tests on image 50. Image 50 runs on platform 52. And, it is appreciated that the platforms are not required to be virtual machines, but may be operating systems themselves, as shown for test component 24. Test component 24 is located in deployed image 40 (after insertion in the development environment, followed by deployment of the software into image 40). Image 40 resides in operating system 42.

Figure 2:
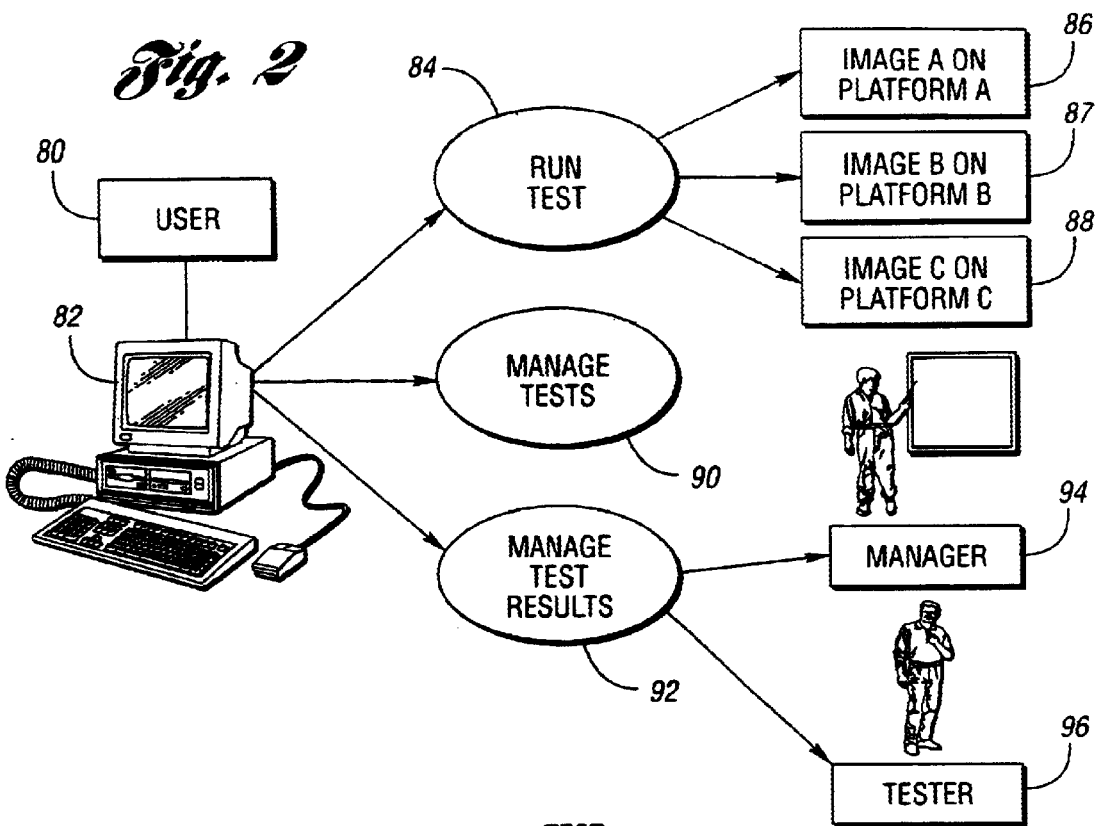
FIG. 2 is a process flow diagram illustrating operation of the test automation system by a user.

As best shown in FIG. 2, the software-testing automation system engine implements the major use cases for a test automation project. The test engine knows how to run a test, how to create or change a test, and how to display test results. The user interface allows the user to modularly create a test that can exercise several software pieces across multiple platforms all in one test. The software may be an image exercised via a test component that communicates with the test engine, an image exercised via a test tool that communicates (possibly through an adaption layer) with the test engine, an external script, an external program, or even a database query, to name a few examples. The user interface presents the test building-blocks in a manner that hides the implementation of the test engine's test tools and of any external test tools 26. The test engine tools may be, for example, UNIX scripts (for example, a script that reloads the database), NT commands (for example, a script that starts a VISUALWORKS GUI), a VISUALWORKS GUI tool, a JAVA GUI tool, a voice mail service order tool, a phone call simulation tool, etc.).

In accordance with the present invention, when an application under test is started, the test component listens for a connection request from a testing tool (either built into the engine, or external to the engine) on a testing port, such as a specific numbered TCP/IP socket. When a connection request arrives, a connection is established and the test component waits for request messages. The request messages instruct the test component to perform various tasks at the object level (as opposed to the bitmap level). That is, when the deployed image under test includes, for example, a graphical user interface having various objects, the test component follows orders received over the testing connection to operate at the object level. At the object level, the test component may, for example, enter text into a specific widget (text input box) on the application under test. Further, the test component may retrieve the text value from a specific widget on the application's window. Further, the test component may open a new window. Further, the test component may press a graphical user interface button on the application. Advantageously, the test component operates on the object level, as opposed to the bitmap level. The testing tool of the test engine can interact with the application under test by sending a series of request messages to the test component.

Figure 3:
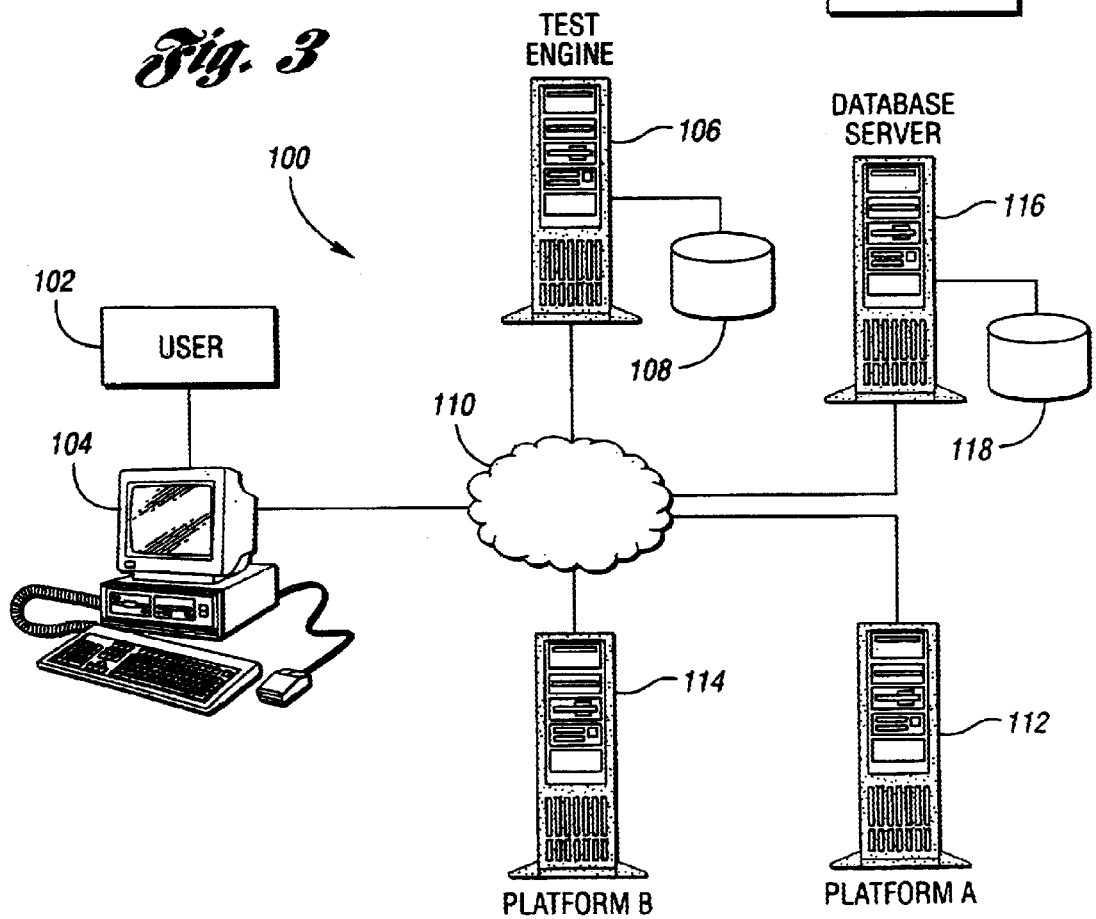
FIG. 3 is a block diagram illustrating the use of a software-testing automation system of the present invention over a network.

In FIG. 3, the various use case descriptions of an exemplary implementation of the present invention are shown. A user 80 interfaces with the test engine at, for example, a workstation 82. As mentioned above, a user 80 may run tests 84 on various platforms 86, 87 88, manage tests 90, manage test results 92 including manager 94 and tester 96.

I. Run Test

Basic Flow of Events

The use case begins when the user asks the TestAutomater to run tests. The TestAutomater displays the list of available test cases and asks the user to specify the test cases to be run. Once the user provides that information, the TestAutomater asks the user to specific the test environment, for example: location of test files; database, user names and passwords, and version of software-under-test; comment on why test is run; possibly whether to run the test interactively or in the background; and possibly whether to run the test at "human" speed or as fast as possible. Once the user provides that information, the TestAutomater performs the necessary setup. For example, the TestAutomater records the test environment along with the system date and time in the test results data. The TestAutomater cycles through each test step in the test cases specified and exercises the software-under-test accordingly. For each test step, the TestAutomater logs whether it was successful or not. After the TestAutomater has cycled through all the test steps, it writes the test results to the user's screen, including the overall result of the test case, which is based on the success or failure of the individual test steps/cases.

Alternative Flow: Failure Upon Which TestAutomater Aborts the Test Case

When a test step fails, the TestAutomater aborts the test case. After aborting the test case, the TestAutomater writes the test results to the user's screen, including the overall result of the test case, which is based on the success or failure of the individual test steps/cases.

Alternative Flow: Failure Upon Which TestAutomater Continues With the Next Text Step When a test step fails, the TestAutomater tries to continue with the next test step. After the TestAutomater has cycled through all the test steps, it writes the test results to the user's screen, including the overall result of the test case, which is based on the success or failure of the individual test steps/cases.

II. Manage Tests

Create a Test Case

The use case begins when the user asks the TestAutomater to create a test case. The TestAutomater provides a way for the user to enter test step after test step, including test setup steps (for example, checking whether the user runs the correct environment, setting up the database with the UNIX command "dbreload") and test evaluation steps (for example, comparing expected to actual results with the UNIX command "diff"). Once the user has entered all test steps, the TestAutomater asks the user to specify a name and a description for the test case. Once the TestAutomater has this information, it stores the description in the header of the test case and the test case in the test case repository.

Update a Test Case

The alternative flow begins when the user asks the TestAutomater to update a test case. The TestAutomater asks the user to specify the name of the test case s/he would like to update. The TestAutomater displays the specified test case and its test steps. The user can update these test steps, delete them, or add new ones. Once the user has made all the updates, the TestAutomater asks the user to specify a description of the change and a new name for the test case or use the old. Once the TestAutomater has this information, it stores the description in the header of the test case and saves the changes to the test case in the test case repository.

Delete a Test Case

The alternative flow begins when the user asks the TestAutomater to delete a test case. The TestAutomater asks the user to specify the name of the test case s/he would like to delete. Once the user has specified a test case, the TestAutomater deletes the test case from the test case repository.

III. Manage Test Results

Lookup and Manage Test Results

The use case begins when the user asks the TestAutomater to look up test results. The TestAutomater displays the list of available test cases and asks the user to specify: the test case; the date for which to look up the test results; the test results type: the test results summary; the test results (listing each test step); and the test results including error data (listing each test step and its associated error messages where appropriate). Once the user has provided this information, the TestAutomater displays the test results on the user's screen. The TestAutomater displays the option to send an e-mail with the test results to a manager so s/he knows the state of the code, a tester so s/he can determine why a test failed, etc. If the user selects the e-mail option and provides the necessary information such as test results type, receiver name, receiver address, and a note, the TestAutomater assembles and sends the e-mail.

Manage Test Results Immediately After Running a Test

The alternative flow gets executed when the user has run a test case. The TestAutomater displays the option to send an e-mail with the test results to a manager so s/he knows the state of the code, a tester so s/he can determine why a test failed, etc. If the user selects the e-mail option and provides the necessary information such as test results type, receiver name, receiver address, and a note, the TestAutomater assembles and sends the e-mail.

In FIG. 3, a network implementation of the present invention is generally indicated at 100. A user 102 interfaces with the test engine at workstation 104. All the software under test and the test engine are in communication with each other over network 110. As shown, the test engine may run remotely from the user, for example, at test engine server 106. Further, the test engine may keep information in a database such as local database 108. Alternatively, the test engine may utilize a remote database. The tests performed by the test engine may involve contacting various deployed images (and test tools in an embodiment utilizing adaption layers) running on various platforms at different locations on the network. For example, during the performance of a single test by user 102, the test engine tools may contact a deployed image on platform 112 and also contact a deployed image on platform 114, in addition to contacting database server 116 with associated database 118. That is, a single test at the test engine may invoke various testing tools that contact various different deployed images spread across multiple platforms spread across multiple physical locations on the network.

In FIG. 4, an exemplary user interface for the test engine is generally indicated at 130. In the example, the test creates an in action for a residential mailbox and verifies that the GUI has correctly saved it in the database. As shown in FIG. 4, a preferred embodiment of the present invention utilizes a test engine with a well-known interface to allow adaption layers to be utilized so that the test engine may communicate with various test tools, such as graphical user interface test tools. Further, the test engine preferably is configured to run external scripts as well as external programs and database queries. The example shown in FIG. 4 illustrates the use of the various functions of a preferred embodiment of the test engine. Specifically, the test components that are utilized in some embodiments of the present invention are particularly useful for use with graphical user interfaces. That is, the test engine or test tool communicates with the test component of the graphical user interface image.

In the example, first, the test result database is cleaned, and the database is then set up using UNIX scripts. Thereafter, the mailbox graphical user interface is started by running an external program which is illustrated as an NT batch job. Once the graphical user interface is open, a graphical user interface test tool is used to perform various commands at the object level within the graphical user interface. Specifically, the GUI test tool enters text, verifies the text has been entered correctly, presses a GUI button to continue, and then enters more text in various windows. The information is saved by pressing a GUI button. Thereafter, the test engine runs a database query, illustrated as a structured query language (SQL) query to retrieve the data from the database so that it may be verified. Lastly, an external UNIX script is utilized to compare the stored data in the database to the expected data.

It is appreciated that embodiments of the present invention utilize a test engine that may communicate with various elements including a test component within a deployed image, as well as various test tools. Further, the test engine may run external scripts, external programs, as well as query databases. Specifically, the test engine preferably communicates with test tools through a well-known test engine interface that communicates with the test tool through an adaption layer that is adapted to the applications programming interface of the test tool. Embodiments of the present invention have many advantages, and provide an open-architecture, flexible software-testing automation system that can exercise a plurality of tools across multiple software and hardware platforms. Because software testers often need to execute a sequence of different types of test steps to complete one test, embodiments of the present invention simplify testing. Examples of different test steps include GUI test steps, such as open window and put text, NT batch files, UNIX scripts running on a server, database queries, etc. Embodiments of the present invention have many advantages over commercially available GUI test tools that only allow testers to execute a single type of test step. Embodiments of the present invention allow testers to, through one interface, create tests by mixing and matching different types of test steps, start all of these different test steps with a single button press, and view the results from all the different tools and platforms in summary or detailed format.

Advantageously, the testers need only familiarize themselves with one test tool, the software-testing automation system of the present invention, but may take advantage of any of the tools plugged into the system through the test engine interface. Further, the testers do not need to know any details about the tools that execute the different test steps, as the adaption layer and test engine interface make these details transparent to the end tester. For example, the tester does not need to know how to create tests in any one of the plugged in test tools, how to run them, or how to read the results. Advantageously, the test engine of the present invention communicates through the interface adaption layer to simplify everything. Because the test tool is transparent, a tool may be replaced by another one without the tester knowing about it or having to change the test, because the necessary adaptive work to switch tools can take place at the level of the test engine.

In a preferred embodiment, the software-testing automation system includes a user interface, a test engine, and any needed adaption layers. The adaption layers adapt the test tool's applications programming interface to the interface of the test engine. The test engine stores the sequence of test steps, knows how to dispatch them to the appropriate tool when run, and consolidates the test results from the various tools into one format for display through the user interface. Advantageously, the test engine has a publicly known or well-known interface so that new tools may be plugged in.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A software-testing automation system for testing a plurality of deployed images that are spread across multiple software platforms wherein each deployed image includes a test component configured to accept a connection on a known testing port, and wherein the test component for a deployed image is inserted in a development environment and is then integrated into the image upon deployment, the system comprising:
    a test engine configured to run a plurality of tests on the plurality of deployed images, the test engine running a test on an image under test by requesting a connection to the corresponding test component on the known testing port and sending commands over the connection; and
    a user interface connected to the test engine to allow a user to control the test engine and to view test results.

2. The system of claim 1 wherein the test engine is further configured to create and manage tests under the direction of a user interacting with the test engine through the user interface.

3. The system of claim 1 wherein the test engine is further configured to display test results through the user interface.

4. The system of claim 1 wherein at least one of the known testing ports is a transmission control protocol/Internet protocol well-known port.

5. The system of claim 4 wherein each known testing port is the same transmission control protocol/Internet protocol well-known port.

6. The system of claim 1 wherein each test component is configured to, upon receiving commands over the testing port, operate on an object level to enter text into a text input box in the corresponding image.

7. The system of claim 1 wherein each test component is configured to, upon receiving commands over the testing port, operate on an object level to retrieve a text value from a text box in the corresponding image.

8. The system of claim 1 wherein each test component is configured to, upon receiving commands over the testing port, operate on an object level to open a new window in the corresponding image.

9. The system of claim 1 wherein each test component is configured to, upon receiving commands over the testing port, operate on an object level to press a button in a graphical user interface of the corresponding image.

10. A software-testing automation system for testing a plurality of deployed images that are spread across multiple software platforms including multiple different virtual machines and operating systems, the system comprising:
    a plurality of test components, each deployed image including a corresponding test component, each test component being configured to accept a connection on a known testing port, and wherein the corresponding test component for a deployed image is inserted in a development environment and is then integrated into the image upon deployment such that the test component for a deployed image operates at an object level of a corresponding software platform;
    a test engine configured to run a plurality of tests on the plurality of deployed images, the test engine running a test on an image under test by requesting a connection to the corresponding test component on the known testing port and sending commands over the connection; and
    a user interface connected to the test engine to allow a user to control the test engine and to view test results.

11. The system of claim 10 wherein the test engine is further configured to create and manage tests under the direction of a user interacting with the test engine through the user interface.

12. The system of claim 10 wherein the test engine is further configured to display test results through the user interface.

13. The system of claim 10 wherein at least one of the known testing ports is a transmission control protocol/Internet protocol well-known port.

14. The system of claim 13 wherein each known testing port is the same transmission control protocol/Internet protocol well-known port.

15. The system of claim 10 wherein each test component is configured to, upon receiving commands over the testing port, operate on an object level to enter text into a text input box in the corresponding image.

16. The system of claim 10 wherein each test component is configured to, upon receiving commands over the testing port, operate on an object level to retrieve a text value from a text box in the corresponding image.

17. The system of claim 10 wherein each test component is configured to, upon receiving commands over the testing port, operate on an object level to open a new window in the corresponding image.

18. The system of claim 10 wherein each test component is configured to, upon receiving commands over the testing port, operate on an object level to press a button in a graphical user interface of the corresponding image.

19. A computer readable storage medium having instructions stored thereon executable by a computer to perform automated software testing for a plurality of deployed images that are spread across multiple software platforms wherein each deployed image includes a test component configured to accept a connection on a known testing port, and wherein the test component for a deployed image is inserted in a development environment and is then integrated into the image upon deployment, the medium comprising:

test engine instructions for running a plurality of tests on the plurality of deployed images, the test engine instructions running a test on an image under test by requesting a connection to the corresponding test component on the known testing port and sending commands over the connection.

20. A software-testing automation system for communicating with a plurality of test tools that are spread across multiple software platforms, each test tool having an applications programming interface, the system comprising:

a test engine configured to communicate with the plurality of test tools, the test engine having a well-known interface;

a plurality of adaption layers, each adaption layer connecting the test engine well-known interface to the applications programming interface of a corresponding test tool; and a user interface connected to the test engine to allow a user to control the test engine and to view the test results.

21. The system of claim 20 wherein at least one of the test tools is a graphical user interface test tool operative to receive commands through the corresponding adaption layer.

22. The system of claim 21 wherein the graphical user interface test tool is configured to, upon receiving commands through the corresponding adaption layer, operate on an object level to enter text into a text input box in the corresponding image.

23. The system of claim 21 wherein the graphical user interface test tool is configured to, upon receiving commands through the corresponding adaption layer, operate on an object level to retrieve a text value from a text box in the corresponding image.

24. The system of claim 21 wherein the graphical user interface test tool is configured to, upon receiving commands through the corresponding adaption layer, operate on an object level to open a new window in the corresponding image.

25. The system of claim 21 wherein the graphical user interface test tool is configured to, upon receiving commands through the corresponding adaption layer, operate on an object level to press a button in the corresponding image.

26. The system of claim 20 wherein the test engine is further configured to display test results through the user interface.

27. The system of claim 20 wherein the test engine is further configured to create and manage tests under the direction of a user interacting with the test engine through the user interface.

28. The system of claim 20 wherein the test engine is further configured to run an external script that is external to the test engine.

29. The system of claim 20 wherein the test engine is further configured to run a database query.

30. The system of claim 20 wherein the test engine is further configured to run an external program that is external to the test engine.

31. A software-testing automation system for communicating with a plurality of test tools that are spread across multiple software platforms, each test tool having an applications programming interface, the system comprising:

a test engine configured to communicate with the plurality of test tools, the test engine having a well-known interface, the test engine being further configured to run an external script, to run an external program, and to query a database;

a plurality of adaption layers, each adaption layer connecting the test engine well-known interface to the applications programming interface of a corresponding test tool; and a user interface connected to the test engine to allow a user to control the test engine and direct the communications through the adaption layers with the test tools, and direct the running of scripts and programs, and the running of database queries.

\* \* \* \* \*